United States Patent
Huber et al.

(10) Patent No.: US 10,281,656 B2
(45) Date of Patent: *May 7, 2019

(54) ELECTIVELY COUPLING A LASER BEAM INTO A MULTI-CLAD FIBER

(71) Applicant: TRUMPF Laser- und Systemtechnik GmbH, Ditzingen (DE)

(72) Inventors: Rudolph Huber, Aldingen-Aixheim (DE); Wolfgang Andreasch, Weinstadt (DE); Martin Huonker, Schramberg (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/279,781

(22) Filed: Sep. 29, 2016

(65) Prior Publication Data
US 2017/0031105 A1    Feb. 2, 2017

Related U.S. Application Data

(63) Continuation of application No. 14/300,138, filed on Jun. 9, 2014, now Pat. No. 9,482,821, which is a
(Continued)

(30) Foreign Application Priority Data

Apr. 8, 2010   (DE) .................. 10 2010 003 750

(51) Int. Cl.
*G02B 6/35*     (2006.01)
*G02B 6/42*     (2006.01)
(Continued)

(52) U.S. Cl.
CPC .......... *G02B 6/3508* (2013.01); *B23K 26/064* (2015.10); *B23K 26/067* (2013.01);
(Continued)

(58) Field of Classification Search
CPC ............. B23K 26/073; B23K 2203/06; B23K 26/067; B23K 26/064; G02B 6/03644;
(Continued)

(56) References Cited

U.S. PATENT DOCUMENTS 3,941,670 A    3/1976   Pratt
3,975,082 A    8/1976   Winzer
(Continued)

FOREIGN PATENT DOCUMENTS

CN      1580865 A     2/2005
DE      3833992 A1    4/1990
(Continued)

OTHER PUBLICATIONS

Extended European Search Report dated Jul. 1, 2013.
(Continued)

*Primary Examiner* — Akm E Ullah
(74) *Attorney, Agent, or Firm* — Fish & Richardson P.C.

(57) ABSTRACT

The invention concerns a method for generating a laser beam (3) with different beam profile characteristics, whereby a laser beam (2) is coupled into one fiber end (1a) of a multi-clad fiber (1), in particular a double-clad fiber, and emitted from the other fiber end (1b) of the multi-clad fiber (1) and whereby, to generate different beam profile characteristics of the output laser beam (3), the input laser beam (2) is electively coupled either at least into the inner fiber core (4) of the multi-clad fiber (1) or at least into at least one outer ring core (6) of the multi-clad fiber (1), as well as a corresponding arrangement (10).

15 Claims, 5 Drawing Sheets

Related U.S. Application Data continuation of application No. 13/639,401, filed as application No. PCT/EP2011/055484 on Apr. 8, 2011, now Pat. No. 8,781,269.

(51) Int. Cl.

| | | |
|---|---|---|
| *B23K 26/064* | (2014.01) | |
| *B23K 26/073* | (2006.01) | |
| *G02B 6/036* | (2006.01) | |
| *G02B 6/26* | (2006.01) | |
| *G02B 6/02* | (2006.01) | |
| *B23K 26/067* | (2006.01) | |
| *B23K 103/06* | (2006.01) | |

(52) U.S. Cl.
CPC ........ *B23K 26/073* (2013.01); *G02B 6/02042* (2013.01); *G02B 6/03644* (2013.01); *G02B 6/262* (2013.01); *G02B 6/35* (2013.01); *G02B 6/4206* (2013.01); *G02B 6/4296* (2013.01); *B23K 2103/06* (2018.08)

(58) Field of Classification Search
CPC .. G02B 6/262; G02B 6/4206; G02B 6/02042; G02B 6/35; G02B 6/3508
See application file for complete search history.

(56) References Cited

U.S. PATENT DOCUMENTS

| | | | |
|---|---|---|---|
| 4,475,788 A | 10/1984 | Tomassini et al. | |
| 4,575,181 A | 3/1986 | Ishikawa | |
| 5,461,692 A | 10/1995 | Nagel | |
| 5,475,704 A * | 12/1995 | Lomashevich | G02B 6/12004 |
| | | | 372/21 |
| 5,684,642 A | 11/1997 | Zumoto et al. | |
| 6,819,815 B1 * | 11/2004 | Corbalis | G02B 6/3588 |
| | | | 385/16 |
| 7,372,877 B2 | 5/2008 | Shirakawa et al. | |
| 7,379,237 B1 | 5/2008 | Di Teodoro et al. | |
| 7,379,648 B1 | 5/2008 | Brooks et al. | |
| 7,592,568 B2 | 9/2009 | Vamham et al. | |
| 7,720,340 B2 | 5/2010 | Lewis et al. | |
| 7,738,166 B2 | 6/2010 | Munson et al. | |
| 7,809,225 B2 | 10/2010 | Bouma et al. | |
| 7,839,902 B2 | 11/2010 | Li et al. | |
| 7,933,479 B2 | 4/2011 | Gonthier et al. | |
| 8,008,600 B2 | 8/2011 | Nakamae et al. | |
| 8,076,632 B2 | 12/2011 | Kreysing et al. | |
| 8,094,370 B2 | 1/2012 | Lewis | |
| 8,326,099 B2 | 12/2012 | Singer et al. | |
| 8,456,523 B2 | 6/2013 | Stork Genannt Wersborg | |
| 8,781,269 B2 * | 7/2014 | Huber | B23K 26/073 |
| | | | 385/147 |
| 9,482,821 B2 * | 11/2016 | Huber | B23K 26/073 |
| 2002/0071647 A1 | 6/2002 | Manzur | |
| 2002/0168139 A1 * | 11/2002 | Clarkson | G02B 6/262 |
| | | | 385/27 |
| 2002/0172485 A1 | 11/2002 | Keaton et al. | |
| 2005/0031261 A1 | 2/2005 | Tanaka | |
| 2006/0251367 A1 | 11/2006 | Seifert et al. | |
| 2006/0263024 A1 | 11/2006 | Dong et al. | |
| 2011/0305249 A1 * | 12/2011 | Gapontsev | B23K 26/043 |
| | | | 372/6 |
| 2013/0064706 A1 | 3/2013 | Schwarze et al. | |
| 2015/0217402 A1 * | 8/2015 | Hesse | B23K 26/0648 |
| | | | 219/121.72 |
| 2015/0378184 A1 * | 12/2015 | Tayebati | G02F 1/295 |
| | | | 250/492.1 |

FOREIGN PATENT DOCUMENTS

| | | | | |
|---|---|---|---|---|
| DE | 3833993 | A1 | 4/1990 | |
| DE | 4200587 | C1 | 4/1993 | |
| EP | 0362466 | A2 | 9/1990 | |
| FR | 2284892 | A1 | 4/1976 | |
| GB | 2449689 | A | 12/2008 | |
| KR | 100750511 | B1 | 8/2007 | |
| WO | WO 2009/155536 | | 12/2009 | ............ G02B 6/255 |
| WO | WO2010009101 | A2 | 1/2010 | |

OTHER PUBLICATIONS

International Search Report dated May 6, 2011.
German Office Action dated Nov. 22, 2010.
Indian Office Action for Indian Application No. 8560/CHENP/2012 by Controller Ambigaapathy A, dated Nov. 20, 2017.

* cited by examiner

ELECTIVELY COUPLING A LASER BEAM INTO A MULTI-CLAD FIBER

CROSS-REFERENCE TO RELATED APPLICATIONS

This application is a continuation of and claims priority under 35 U.S.C. § 120 to U.S. Ser. No. 14/300,138, filed on Jun. 9, 2014, which is a continuation of U.S. Ser. No. 13/639,401, filed on Dec. 20, 2012, which is a 371 National Phase Application of PCT Application No. PCT/EP2011/055484 filed on Apr. 8, 2011, which claims priority to German Application No. DE 10 2010 003750.8, filed on Apr. 1, 2010. The entire contents of these priority applications are incorporated herein by reference.

TECHNICAL FIELD

The invention concerns a method and arrangement for the generation of a laser beam with different beam profile characteristics.

BACKGROUND

In materials processing by means of laser beams, different processes and applications have different requirements for characteristic laser beam parameters such as focal diameter, intensity distribution or beam profile quality at the processing point. Therefore, changing a process or application in a laser machining system usually involves the necessary resetting work, which may range from relatively simple replacement of individual optical components to transfer to a different system.

For example, DE 38 33 992 A1 describes a method for achieving specific laser beam properties in which the laser beams of two laser beam sources are coupled into a conventional optical fiber at different coupling angles. A beam is thus created, depending on the coupling angles of the two laser beams, with various wavelengths which are selected to suit the biological or medical processing task at hand. In addition to the use of two laser sources, this method may also employ just one laser source with a variable wavelength. The coupling conditions into the optical fiber depend greatly on the wavelength here. However, if, for example, the applications do not have different wavelengths or rather even require the use of a single wavelength, the method outlined proves not to be optimum on account of its disproportionate complexity for such cases and its limiting specialisation in applications of a different type. Moreover, the method proposed is limited to the beam formation dependent on the wavelength which, in turn, leads to limitations for its potential applications.

SUMMARY

Therefore, the object of the present invention is to indicate a method for generating a laser beam with different laser beam profile characteristics which, using several laser beam sources or just one laser beam source, in particular with a single wavelength, allows an application-specific change to the laser beam characteristics with relatively little effort, and to provide an arrangement for this method. A further aim is to expand the range of adaptation potential of beam profile characteristics to miscellaneous applications as far as possible, while reducing the complexity of the arrangement and the method.

In accordance with the invention, this object is solved by a method in which a laser beam is coupled into one fiber end of a multi-clad fiber, in particular a double-clad fiber, and coupled out of the other end of the multi-clad fiber and, to generate different beam profile characteristics of the output laser beam, the input laser beam is electively coupled either at least into the inner fiber core of the multi-clad fiber or at least into at least one outer ring core of the multi-clad fiber or, however, electively a first laser beam is coupled at least into the inner fiber core of the multi-clad fiber and a different, second laser beam is coupled at least into at least one outer ring core of the multi-clad fiber.

In this invention, a multi-clad fiber means a fiber with one inner fiber core and at least one outer ring core, for example a double-clad fiber with a single outer ring core or also a triple-clad fiber with an additional outer ring core adjacent to the first outer ring core. To change the beam profile characteristics of the output laser beam, the input laser beam is coupled variously into one or more of the cores of the multi-clad fiber.

For the sake of simplicity, the invention will be described in the following using a double-clad fiber. It will be clear to an expert that the principle of the invention can easily also be transferred to multi-clad fibers with additional outer ring cores adjacent to the first outer ring core.

A double-clad fiber with two cores has an inner fiber core and cladding surrounding this fiber core that is as thin and low-refractive as possible. This is followed by a single outer ring core which is also surrounded by low-refractive second cladding. This may be followed by an additional layer of glass which determines the external diameter of the fiber but has no influence on its function in terms of beam guidance. This is completed by a coating of a synthetic material such as silicone and/or nylon which serves to protect the fiber.

By using a double-clad fiber, the present invention makes it possible to choose between different beam profile characteristics at the fiber output, depending on whether the beam is coupled into the inner fiber core, the outer ring core or into both the inner fiber core and the outer ring core. In material processing using laser beams, in particular using high power in the kW range, the ability to switch between these coupling variants makes it possible, for example to choose between a comparatively good beam quality with a sharp focus as is required, for example, for a laser cutting process, and, in contrast, a 'reduced' beam quality with a 'blurred' focus with almost uniform intensity distribution in the beam cross-section, which is particularly suitable for welding processes.

To achieve a high laser beam quality, the laser beam is coupled into the inner fiber core of the double-clad fiber, which, in this case, behaves like a conventional standard fiber, the fiber core of which is surrounded by low-refractive cladding. However, if a laser beam with a wider profile and, for example, with uniform intensity is required, the laser beam is coupled into the outer ring core or into both the inner fiber core and the outer ring core. Depending on the application, therefore, at the output of the double-clad fiber, a laser beam can be achieved with a filled circular profile in accordance with the inner fiber core, with a ring profile in accordance with the outer ring core, with a filled circular profile in accordance with the two core areas together (with a narrow missing ring through the first cladding) or with the corresponding intermediate stages of the stated profile characteristics.

In a preferred version of the method in accordance with the invention, for the elective coupling of the laser beam into the double-clad fiber, relative motion takes place between the input laser beam and the coupling-side face of the double-clad fiber in a direction transverse to the laser beam, in particular in the form of parallel displacement. If the coupling-side face of the double-clad fiber is moved transverse to the laser beam, no additional optical elements are required to switch between the various couplings. With sufficiently long free beam propagation of the laser beam before it strikes the double-clad fiber, angular deflection of the laser beam, which is also understood as deflection transverse to the axis of the coupling-side face, is also possible in order to couple the laser beam into the inner fiber core and/or into the outer ring core of the double-clad fiber. In this case, this involves rotation of the laser beam axis about a point instead of displacement, whereby the change in the angle of incidence should remain negligible for the coupling.

In another preferred version of the method in accordance with the invention, for electively coupling of the laser beam into the double-clad fiber, the input laser beam is projected with different beam cross-sections, in particular with different beam diameters, onto the coupling-side face of the double-clad fiber. These different beam diameters can be set, for example with optics that can travel along the laser beam axis such as a lens or aperture which, depending on its travel position, couples the laser beam either only into the inner fiber core or into the outer ring core or into both the inner fiber core and the outer ring core. Alternatively, a different beam cross-section or diameter can also be set by optics such as a lens or aperture being electively moved into or out of the beam path of the laser beam. In another alternative, the beam cross-section or diameter can be adapted to desired coupling conditions into the double-clad fiber using a laser source with alternative guidance options via optical fibers with different beam guidance characteristics, which can, for example, be set via the diameter of the beam guidance optical fiber core. This principle of choosing the coupling conditions into the double-clad fiber can also be applied to the use of the laser beam sources assigned to the upstream optical fibers, in particular to laser beam sources of different beam qualities.

In another preferred version of the method in accordance with the invention, for the coupling of the laser beam both into the inner fiber core and into the at least one outer ring core, the input laser beam is divided into at least two sub-beams, each of which is coupled into one of the two cores of the double-clad fiber. This allows the division of the beam power between the inner fiber core and the outer ring core to be particularly well controlled if they are to be used simultaneously. With the two sub-beams, it is also possible, in a particularly easy fashion, to omit the area of the first cladding of the double-clad fiber in connection with coupling. Specifically for applications in the high-power area, it is important that no laser beam is coupled into the first or second cladding of the double-clad fiber. Any such beam coupled into the cladding is propagated with a large angle in relation to the fiber axis in the inner fiber core or outer ring core and emerges at the fiber end also with a large angle, as a result of which connecting optics can become heated. In addition, a beam in the second cladding can destroy the coating of the fiber. To safely prevent the propagation of the laser beam in the cladding, mode strippers can be used, for example. Accordingly, it is preferred also not to couple any laser beam into the double-clad fiber during the switching process in order to prevent any propagation in the cladding. This can be done, for example, by switching the laser off or deflecting the beam into an absorber by using beam shutters.

In another aspect, the invention also concerns an arrangement suitable for implementing the method described above. The arrangement in accordance with the invention comprises a double-clad fiber with one inner fiber core and at least one outer ring core and a switchable device with at least two switch positions in which the input laser beam is electively coupled either at least into the inner fiber core of the double-clad fiber or at least into the at least one outer ring core of the double-clad fiber or, electively, a first laser beam is coupled at least into the inner fiber core of the multi-clad fiber and a different, second laser beam is coupled at least into one outer ring core of the multi-clad fiber.

In a preferred embodiment of the arrangement in accordance with the invention, the switchable device is formed by adjustable deflection optics which, in their at least two switch positions, deflect an input laser beam in a direction transverse to the axis of the coupling-side face of the double-clad fiber to varying extents or formed by a control device which, in its at least two switch positions, moves the coupling-side face in a direction transverse to the input laser beam to varying extents. Deflection optics in accordance with the invention mean any adjustable optics that couples a laser beam, depending on the adjustment position, into at least partially different fiber areas of the double-clad fiber.

In another preferred embodiment of the arrangement in accordance with the invention, the switchable device is formed by mobile optics or a mobile aperture which, in their at least two switch positions, project the input laser beam with different beam cross-sections, in particular with different beam diameters, onto the coupling-side face of the double-clad fiber. The mobile optics can, for example, be prisms, plane-parallel (glass) plates, convex and concave lenses, mirrors, diffractive optical elements, etc. individually or in combinations.

It is particularly preferred for the optics to be formed by a beam divider, in particular by an optical wedge plate that can be moved into the laser beam, to divide the input laser beam into at least two sub-beams, each of which is coupled into one of the cores of the double-clad fiber. Advantageously, the division of the intensity between the inner fiber core and the outer ring core depends on how far the beam divider intervenes in the beam path. This makes it possible to adapt the intensity division and thus the beam profile of the output laser beam optimally to each application.

However, the wedge plate can also be used as a beam switch to couple the laser beam in its entirety either into the inner fiber core or into the outer ring core. Moving/displacing the coupling optics transverse to the optical axis of the laser beam causes a comparable effect. In this version, the coupling optics are located in the beam path in the switchable states, producing different beam deflections, depending on the position of the coupling optics. As the beam is not divided here and the intensities cannot be divided via sub-beams, it is preferred to deflect either into the inner fiber core or into the outer ring core and to switch between at least two states representing these positions.

Preferably, the diameter of the inner fiber core of the double-clad fiber is maximum approximately 200 µm, in particular maximum approximately 150 µm, preferably maximum approximately 120 µm. For example, with a diameter of the inner fiber core of approximately 100 µm, a good quality of the output laser beam can be achieved for demanding laser applications, such as laser cutting processes, in connection with the beam being coupled into the inner fiber core.

The ring thickness of the at least one outer ring core of the double-clad fiber is preferably greater than or equal to the diameter of the inner fiber core. The outer ring diameter corresponds to the wider laser beam profile required for specific applications, such as laser welding, and is approximately 600 μm or 400 μm, for example, depending on the application.

In an advantageous embodiment of the arrangement in accordance with the invention, the numerical aperture of the first cladding surrounding the inner fiber core is higher than the numerical aperture of the second cladding surrounding the at least one outer ring core in a double-clad fiber. As a result, a beam coupled inadvertently into the first cladding can penetrate the second cladding and be emitted and displayed there by a mode stripper. This facilitates the adjustment of the inner fiber core and fault monitoring. For example, the first cladding has a standard numerical aperture of 0.22 (tolerance+/−0.02), whereby the second cladding in this case preferably has a numerical aperture of 0.18 (tolerance+/−0.015) and should be thick enough to guide the laser beam well, for example 10 μm thick, preferably less, such as 3 to 5 μm, with a cladding core diameter ratio (CCDR) of 1.2. The first cladding forms a conventional transport fiber with the inner fiber core.

In another preferred embodiment, the switchable device has, on the input side, at least two optical fibers via which at least two different laser beams can be supplied, whereby the switchable device electively couples one laser beam at least into the inner fiber core of the multi-clad fiber and the other laser beam at least into at least one outer ring core of the multi-clad fiber.

The embodiments described with the use of one or more laser beam sources can also be used in combination, for example within a cascaded system.

Further advantages of the invention are provided in the following description and the drawing. The embodiments shown and described should not be considered to be an exhaustive list. They are instead examples for the purposes of describing the invention. Similarly, the above-mentioned characteristics and those described below can be used individually or in any combinations.

The invention is presented in a number of embodiments in the drawing and will be described in further detail in the following description. The presentation in the figures in the drawing should only be considered to be an outline. It contains no restrictions in respect of details or dimensions and is not to scale.

DETAILED DESCRIPTION

Figure 1:
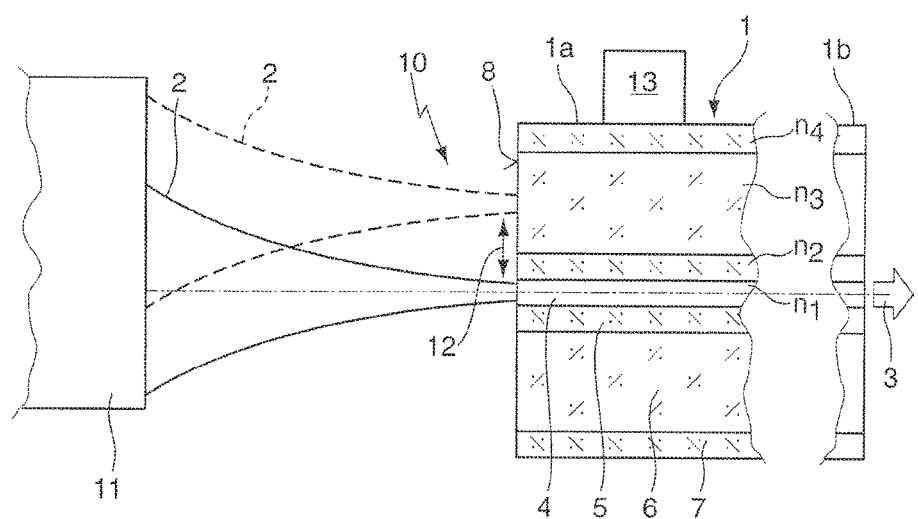
FIGS. 1, 2A, 2B, and 3 show three arrangements in accordance with the invention for generating a laser beam with different beam profile characteristics, in which a laser beam is coupled into the fiber end of a double-clad fiber and emitted from the other fiber end of the double-clad fiber.
Figure 2A:
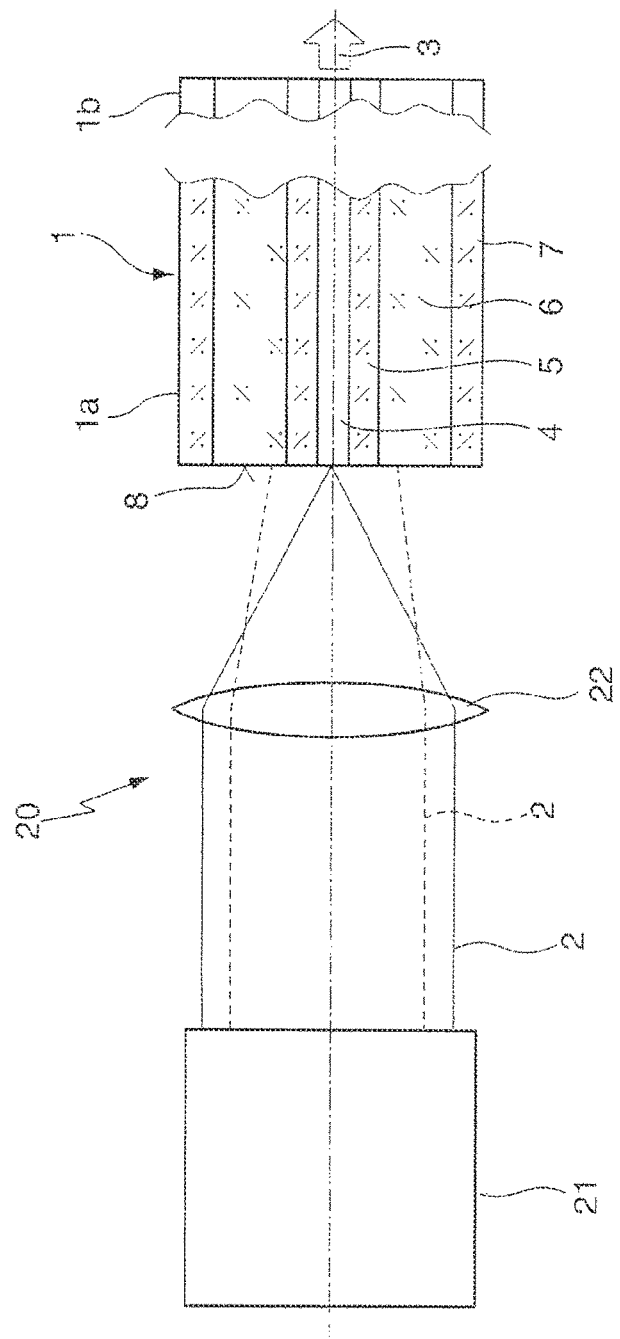
Figure 2B:
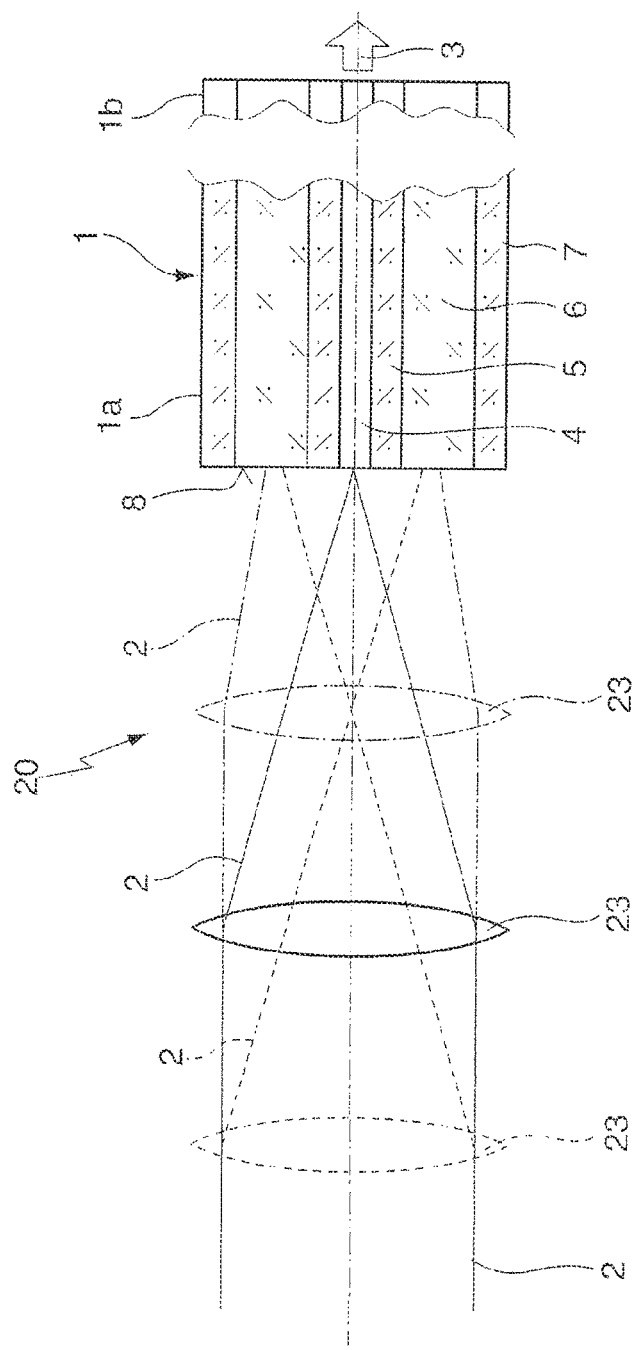
Figure 3:
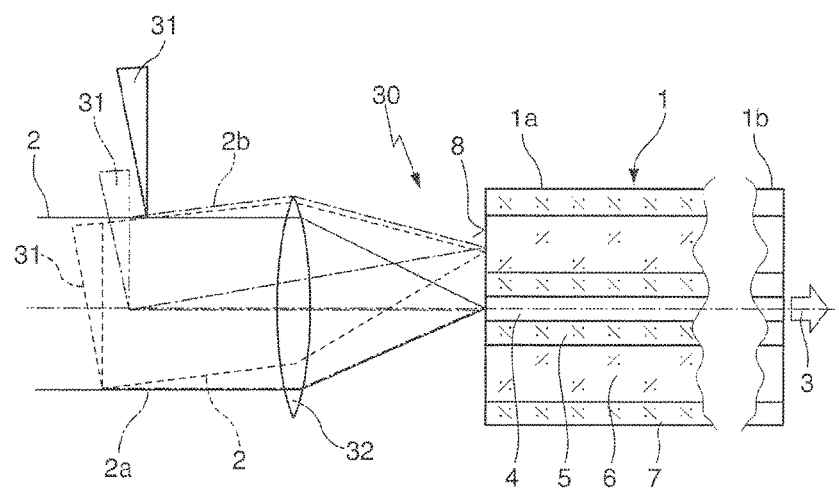

FIGS. 1 to 3 show three different arrangements 10, 20, 30 for generating a laser beam with different beam profile characteristics, whereby the laser beam is coupled into one fiber end 1a of a multi-clad fiber 1, which is a double-clad fiber 1 in the present case, and is emitted from the other fiber end 1b of the double-clad fiber 1. The input laser beam is labelled 2 and the emitted laser beam is labelled 3.

As shown in FIG. 1, the double-clad fiber 1 has an inner fiber core 4 (for example of undoped quartz glass) with a refractive index n1 and thin first cladding 5 (for example of doped quartz glass) surrounding the inner fiber core 4, the refractive index n2 of which is lower than n1. This is followed by an outer ring core 6 (for example of undoped quartz glass) with refractive index n3 which is also surrounded by low-refractive second cladding 7 (for example of doped quartz glass) with refractive index n4. The refractive indices n1 and n3 can be the same or different; the same applies to the refractive indices n2 and n4. This may be followed by an additional layer of glass (not shown) which determines the external diameter of the fiber but has no influence on its function in terms of beam guidance. This is typically completed by a coating (not shown) of a synthetic material such as silicone and/or nylon which serves to protect the fiber.

Figure 4:
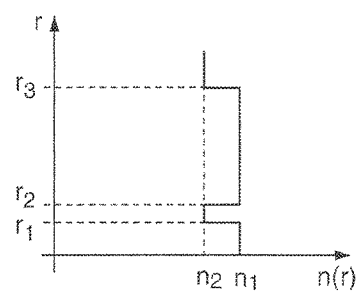
FIG. 4 shows the radial course of the refractive index of the double-clad fiber shown in FIGS. 1 to 3.

FIG. 4 shows an outline of the radial dependence of the refractive index n within the double-clad fiber 1, where n1=n3 and n2=n4. The figure shows an area with radius r1 and high refractive index n1 corresponding to the inner fiber core 4, a ring area between radii r1 and r2 with lower refractive index n2 corresponding to the first cladding 5, a ring area with external radius r3 and high refractive index n1 corresponding to the outer ring core 6 and, finally, the second cladding 7 with low refractive index n2. On account of the lower refractive index of the cladding 5, 7, light is guided in the inner fiber core 4 and in the outer ring core 6 by means of total reflection.

To change the beam profile characteristics of the emitted laser beam 3, it is possible, as described below in detail, for the input laser beam 2 striking the coupling-side face 8 of the double-clad fiber 1 to be coupled, by means of a switchable device, electively either into the inner fiber core 4 or into the outer ring core 6 or both into the inner fiber core 4 and into the outer ring core 6 of the double-clad fiber 1.

In the arrangement 10 shown in FIG. 1, the switchable device for electively coupling the laser beam 2 into the double-clad fiber 1 is formed by adjustable deflection optics 11 with two switch positions, which are represented by continuous and dotted lines. In these two switch positions, the laser beam 2 focused on the coupling-side face 8 is deflected in a direction 12 transverse to the axis of the coupling-side face 8 to varying extents, in particular displaced in parallel to varying extents. In one switch position, the laser beam 2 is coupled centrically or eccentrically to the fiber axis only into the inner fiber core 4 and in the other switch position it is coupled eccentrically to the fiber axis only into the outer ring core 6. In the first case, the emitted laser beam 3 has the beam profile shown in FIG. 5A, i.e. a narrow filled circular profile 51 corresponding to the inner fiber core 4, and a comparatively high beam quality with a sharp focus, as is required for material processing, for example for a laser cutting process. In the second case, the emitted laser beam 3 has the wider beam profile shown in FIG. 5B, i.e. a ring profile 52 corresponding to the outer ring core 6, and a comparatively lower beam quality, as is required for material processing, for example for a laser welding process. Under suitable coupling conditions into the outer ring core 6, the emitted laser beam 3 has a top hat ring beam profile, the quality of which is suitable for many applications.

The deflection optics 11, the components of which are not shown individually in FIG. 1, are based on beam deflection principles familiar to an expert. In particular, a deflection mirror can be used here. The location of the coupling into the coupling-side face of the double-clad fiber 1 can be determined by the angular position of the deflection mirror or the deflection mirror can deflect the beam, depending on position, to various outputs which, in turn, define various coupling areas. A semireflecting deflection mirror or a deflection mirror that is only partially in the beam path can also perform the described function of a beam divider. Preferably, the deflection optics 11 contain additional means for coupling the laser beam 2 into the coupling-side face 8 of the double-clad fiber 1, such as, for example, a focusing lens, which can alternatively also be arranged before or after the deflection optics 11.

A sufficiently long double-clad fiber 1 also allows for angularly homogeneous intensity distribution in the output laser beam 3 with eccentric coupling of the laser beam 2 to the fiber axis into the inner fiber core 4 or the outer ring core 6.

Figures 5A, 5B, 5C:
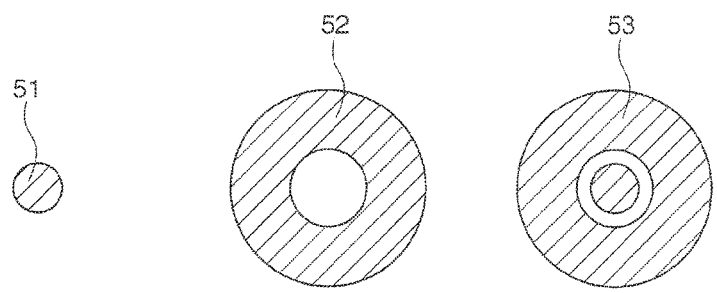
FIGS. 5A, 5B and 5C show various possible beam profiles of the laser beam emitted from the double-clad fiber in FIGS. 1 to 3.

If, however, the beam is coupled both into the inner fiber core 4 and into the outer ring core 6 of the double-clad fiber 1, the output laser beam 3 has the uniformly filled wide beam profile 53 shown in FIG. 5C with an omitted ring corresponding to the first cladding 5.

Alternatively (or in addition) to the deflection optics 11, the switchable device for electively coupling the laser beam 2 into the double-clad fiber 1 can also be formed, for example, by a motor-driven control device 13 which displaces the coupling-side face 8 of the double-clad fiber 1 in a direction 12 transverse to the input laser beam 2 to varying extents, whereby the laser beam 2 focused on the coupling-side face 8 can be coupled either into the inner fiber core 4 or into the outer ring core 6.

In the arrangement 20 shown in FIG. 2A, the switchable device for electively coupling the laser beam 2 into the double-clad fiber 1 is formed by adjustable telescopic/expansion optics 21 which are shown here only in outline. In their switch positions, not shown here, the telescopic/expansion optics 21 expand the input laser beam 2 to different beam diameters. Depending on the beam diameter, the laser beam 2 is then projected by coupling optics (for example a lens) 22 with different beam diameters, in this case different focal diameters, onto the coupling-side face 8 of the double-clad fiber 1. As shown with continuous and dotted lines, the laser beam 2 is, for example, coupled centrically only into the inner fiber core 4 in one switch position of the telescopic/expansion optics 21 and coupled centrically both into the inner fiber core 4 and into the outer ring core 6 in another switch position. In the first case, the output laser beam 3 has beam profile 51 and in the second case beam profile 53.

Via the diameter of the expanded laser beam 2, the proportion of the laser beam coupled into the outer ring core 6 can be set continuously and thus also the intensity distribution into the inner fiber core 4 and the outer ring core 6, allowing the beam profile of the output laser beam 3 to be adapted to each application optimally.

In the arrangement 20 shown in FIG. 2B, the switchable device for electively coupling the laser beam 2 into the double-clad fiber 1 is formed by focusing optics 23 shown here as a lens which can be displaced along the laser beam axis to various switch positions, which are represented by continuous, dotted, and dashed and dotted lines. In these switch positions, the input laser beam 2 is coupled by the focusing optics 23 with different beam diameters onto the coupling-side face 8 of the double-clad fiber 1. In one switch position, the focused laser beam 2 is coupled centrically only into the inner fiber core 4. In the two other switch positions, the defocused laser beam 2 is coupled centrically both into the inner fiber core 4 and into the outer ring core 6. In the first case, the output laser beam 3 has beam profile 51 and in the second case beam profile 53.

In the arrangement 30 shown in FIG. 3, the switchable device for electively coupling the laser beam 2 into the double-clad fiber 1 is formed by a beam switch implemented here only by way of example as an optical wedge plate 31 which can be adjusted continuously between two end positions that are shown with continuous and dotted lines. In one of its end positions, the optical wedge plate 31 is arranged outside the beam path of the input laser beam 2 so that the entire input laser beam 2 is coupled via coupling optics (for example a lens) 32 only into the inner fiber core 4, whereby the output laser beam 3 has beam profile 51. In its other end position, shown by the dotted line, the wedge plate 31 is arranged in the entire beam path of the laser beam 2 so that the entire laser beam 2 is deflected by the wedge plate 31 and is coupled via the coupling optics 32 only into the outer ring core 6, whereby the output laser beam 3 has beam profile 52.

Moving/displacing the coupling optics 32 transverse to the optical axis of the laser beam 2 causes a comparable effect. In this version, the coupling optics 32 are located in the beam path in the switchable states, producing different beam deflections, depending on the position of the coupling optics 32. As the beam is not divided here and the intensities cannot be divided via sub-beams, it is preferred to deflect either into the inner fiber core 4 or into the outer ring core 6 and to switch between at least two states representing these positions.

As indicated with a dotted line, partially introducing the wedge plate 31 into the input laser beam 2 creates two sub-beams 2a, 2b, so that here, for example, the optical wedge plate 31 acts as a beam divider. The first sub-beam 2a is not influenced by the wedge plate 31 and thus continues to be coupled via the coupling optics 32 into the inner fiber core 4, while the second sub-beam 2b is deflected by the wedge plate 31 in relation to the first sub-beam 2a and coupled via the coupling optics 32 into the outer ring core 6. The output laser beam 3 has beam profile 53. Partially introducing the wedge plate 31 into the input laser beam 2 therefore creates two sub-beams 2a, 2b, with a division of intensity between the inner fiber core 4 and the outer ring core 6, depending on the degree of introduction, whereby the beam profile of the output laser beam 3 can be optimally adapted to each application.

Moreover, the two sub-beams 2a, 2b offer the significant advantage that they omit the area of the first cladding 5 in connection with coupling. Specifically for applications in the high-power area, it is important that no laser beam is coupled into the inner or outer cladding 5, 7. This beam is propagated with a large angle in the inner core or outer ring core and emerges at the fiber end also with a large angle, as a result of which connecting optics can become heated. In addition, the beam in the outer cladding 7 can destroy the coating of the fiber 1.

A diameter of the inner fiber core 4 of approximately 100 µm guarantees, for typical applications with high power in the kW range, the production of good beam profile quality in connection with coupling the laser beam 2 into the inner fiber core 4. The first cladding 5 is already sufficiently thick, at approximately 10 µm, preferably at approximately 5 µm, to guide the laser beam well. With a ring thickness of the outer ring core 6 of approximately 240 µm, the external diameter of the outer ring core 6 is approximately 600 μm. For certain applications, such as laser welding, this corresponds to the necessary widening of the laser beam profile.

Figure 6:
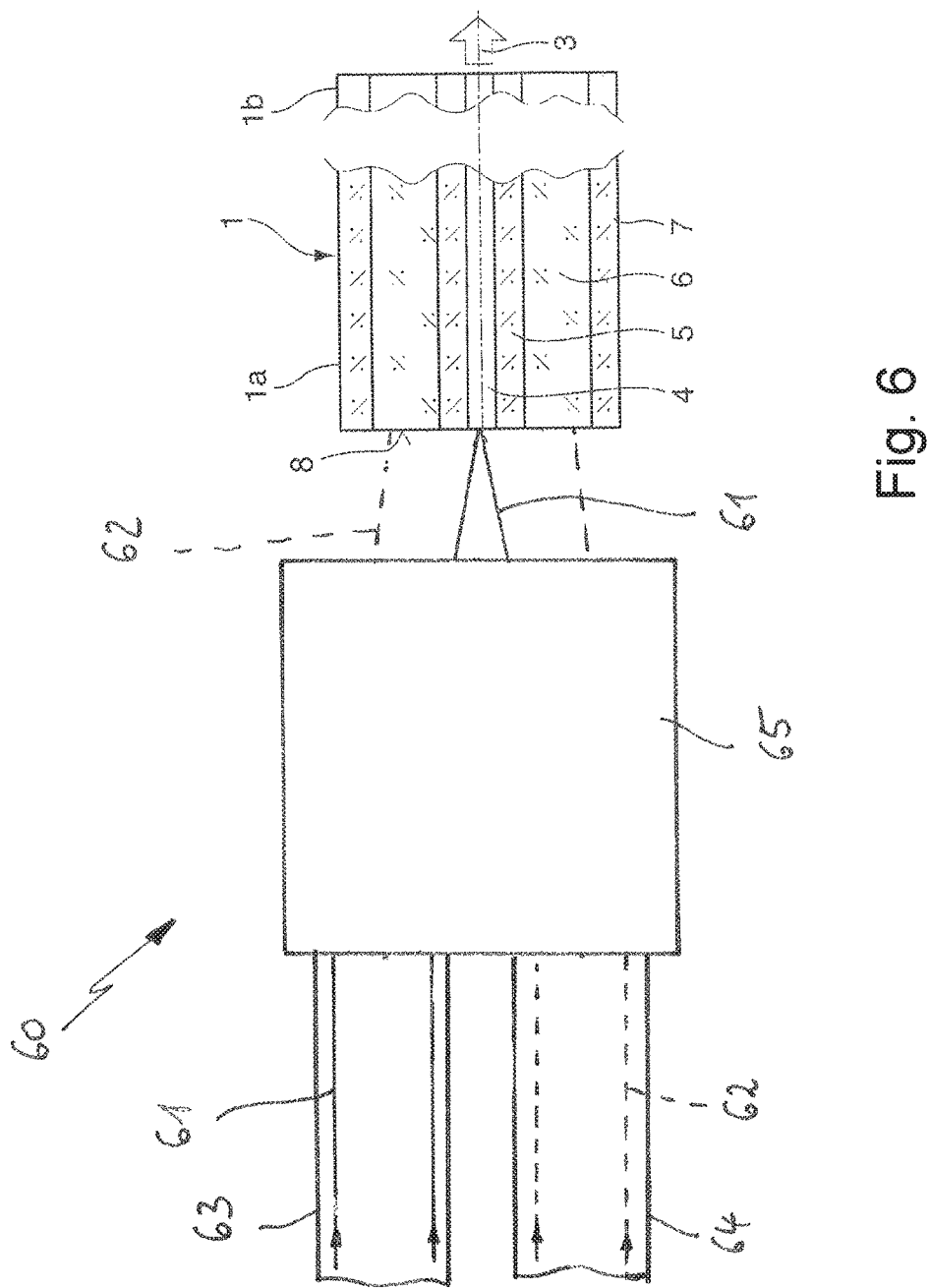
FIG. 6 shows another arrangement in accordance with the invention for generating a laser beam with different beam profile characteristics, whereby, electively, a first laser beam is coupled into the inner fiber core of a double-clad fiber and a different, second laser beam is coupled both into the inner fiber core and into the outer ring core of the double-clad fiber.

FIG. 6 shows another arrangement 60 for generating a laser beam with different beam profile characteristics, whereby, electively, a first laser beam 61 is coupled into the inner fiber core 4 of the double-clad fiber 1 and a different, second laser beam 62 is coupled both into the inner fiber core 4 and into the outer ring core 6 of the double-clad fiber 1. The two laser beams 61, 62, which can, for example, have different beam qualities, are guided in optical fibers 63, 64 to switching optics 65 (for example an optical switch system), shown here only in outline, which can be switched between two switch positions. In one switch position, the first laser beam 61 with the higher beam quality is coupled into the inner fiber core 4 of the double-clad fiber 1 and, in the second switch position, the second laser beam 62 is coupled both into the inner fiber core 4 and into the outer ring core 6 of the double-clad fiber 1. In the first case, the output laser beam 3 has beam profile 51 and in the second case beam profile 53. The double-clad fiber 1 leads to a laser processing machine (not shown) so that the arrangement 60 is used to switch laser beams 61, 62 with different beam qualities for the laser processing machine. However, the laser beam 62 can also only be directed at the outer ring core 6 of the double-clad fiber 1 via the switching optics 65.

Up to now, laser processing machines that are to be supplied with several laser beams of different beam qualities needed several sockets for the various optical fibers and a corresponding optical switch system to allow the various laser beams to be coupled into the following beam path. For a desired laser beam, the appropriate optical fiber cable has to be manually replugged, which is undesirable on account of an increased risk of soiling, or beam guidance optics are required on the laser processing machines themselves. This is disadvantageous as several optical fiber cables have to be laid within the laser processing machine, the entire switching optics have to be mounted and moved on the axis system of the laser processing machine and the size of the switching optics, in connection with the space available, limits the possibilities or the possible optical concepts.

In the arrangement 60, the switching optics 65 are supplied on the input side by two lasers with the two laser beams of different beam qualities, and the respective laser beams 61, 62 are coupled into the central double-clad fiber 1 via the switching optics 65. In this way, the switching between the two laser beams 61, 62 is separated from the axis system of the laser processing machine and takes place outside the laser processing machine itself. The laser beams are then supplied to the machine via the double-clad fiber 1. One or more additional light-guiding ring cores around the outer ring core 6 are also conceivable so that additional laser beams with different beam qualities can be guided via the switching optics 65.

A number of embodiments of the invention have been described. Nevertheless, it will be understood that various modifications may be made without departing from the spirit and scope of the invention. Accordingly, other embodiments are within the scope of the following claims.

What is claimed is:

1. A method for generating a laser beam, comprising:
   coupling a first input laser beam and a second input laser beam into a first end of an optical fiber having an inner fiber core and an outer ring core surrounding the inner fiber core, wherein the coupling includes electively:
   a. coupling the first input beam to the inner fiber core only;
   b. coupling the second input beam into the outer ring core only; or
   c. coupling the first input beam into the inner fiber core and coupling the second input beam into the outer ring core; and
   emitting an output beam from at least one of the inner fiber core and the outer ring core at a second end of the optical fiber, wherein the electively coupling of the first input beam and the second input beam is performed so as to generate different output beam characteristics.

2. The method of claim 1, further comprising:
   before the coupling, guiding the first input laser beam in a first optical input fiber and guiding the second input laser beam in a second optical input fiber, the first and second optical input fibers being disposed upstream from the first end of the optical fiber.

3. The method of claim 1, wherein the optical fiber includes an inner cladding surrounding the inner fiber core between the inner fiber core and the outer ring core and a ring cladding surrounding the ring core.

4. The method of claim 3, wherein the inner fiber core has a maximum diameter of approximately 200 μm.

5. The method of claim 3, wherein the inner cladding is between 5 μm and 10 μm thick.

6. The method of claim 1, wherein the optical fiber includes a second ring core surrounding the outer ring core, and
   wherein the method further comprises: coupling a third input laser beam into the second ring core.

7. The method of claim 6, wherein the optical fiber includes a second ring cladding surrounding the second ring core.

8. The method of claim 1, wherein the first and second input laser beams have different beam qualities.

9. The method of claim 1, wherein the emitting of the output beam comprises:
   a) emitting the output beam from the inner fiber core only,
   b) emitting the output beam from the outer ring core only, or
   c) emitting the output beam from both the inner fiber core and the outer ring core.

10. The method of claim 1, further comprising:
    processing a material using the output beam.

11. The method of claim 10, wherein the processing includes at least one of welding and cutting the material.

12. The method of claim 1, wherein the first and second input laser beams are sub-beams emitted from a single laser.

13. The method of claim 1, further comprising:
    emitting the first input laser beam from a first laser and emitting the second input laser beam from a second laser.

14. The method of claim 1, wherein the second end of the optical fiber includes the second end of the inner fiber core and the second end of the outer ring core, the second ends of the inner fiber core and the outer ring core being flush with one another.

15. The method of claim 1, wherein the output beam has a power of at least 1 kW.

* * * * *